(12) United States Patent
Toy et al.

(10) Patent No.: US 7,792,546 B2
(45) Date of Patent: Sep. 7, 2010

(54) MOBILE ENTERPRISE APPLICATIONS OVER TELEPHONY SYSTEMS AND METHODS

(75) Inventors: Andrew Jong Kein Toy, NY, NY (US); Bruce Alexander Zenel, Brooklyn, NY (US); John Roussochatzakis, Hastings-On-Hudson, NY (US)

(73) Assignee: Morgan Stanley, New York, NY (US)

( * ) Notice: Subject to any disclaimer, the term of this patent is extended or adjusted under 35 U.S.C. 154(b) by 1020 days.

(21) Appl. No.: 11/406,729

(22) Filed: Apr. 19, 2006

(65) Prior Publication Data

US 2007/0081654 A1    Apr. 12, 2007

Related U.S. Application Data

(60) Provisional application No. 60/720,874, filed on Sep. 27, 2005.

(51) Int. Cl.
*H04M 1/00* (2006.01)
(52) U.S. Cl. ..................... 455/555; 455/554.1
(58) Field of Classification Search .......... 455/554–555
See application file for complete search history.

(56) References Cited

U.S. PATENT DOCUMENTS 6,611,689 B1 * 8/2003 Cartigny et al. ............. 455/461

| | | | |
|---|---|---|---|
| 2002/0019246 A1 * | 2/2002 | Forte | 455/555 |
| 2002/0132638 A1 * | 9/2002 | Plahte et al. | 455/555 |
| 2004/0198342 A1 * | 10/2004 | Blickberndt et al. | 455/426.1 |
| 2005/0148362 A1 * | 7/2005 | Jagadeesan et al. | 455/555 |

OTHER PUBLICATIONS

Avaya, IP Softphone for Pocket PC, Release 2.3, Getting Started Manual, Jun. 2004.
Avaya, Avaya Extension to Cellular, Product Information Sheet, 2004, available at: http://www.avaya.com/masterusa/enus/resource/assets/brochures/b1193.pdf (last visited Nov. 2, 2006).

* cited by examiner

*Primary Examiner*—Curtis Kuntz
*Assistant Examiner*—Mohammad K Islam

(57) ABSTRACT

A method of facilitating telecommunication functionality on a mobile device. The method includes receiving a request for a telecommunications transaction from the mobile device and retrieving a callback identifier for a user of the mobile device. The method also includes executing the telecommunications transaction, wherein executing the transaction includes establishing a communications session that includes a callback telephony endpoint represented by the callback identifier and at least one target telephony endpoint, wherein a portion of the communications session that includes the callback telephony endpoint is established at least in part by making an outbound call from a telephony switch.

20 Claims, 5 Drawing Sheets

MOBILE ENTERPRISE APPLICATIONS OVER TELEPHONY SYSTEMS AND METHODS

CROSS REFERENCE TO RELATED APPLICATION

The present application claims priority to U.S. Provisional patent application No. 60/720,874 filed Sep. 27, 2005.

BACKGROUND

Over the past few years, there has been dramatic growth in the adoption of the mobile cellular telephone to the extent that it can largely be considered ubiquitous. This has led to a dichotomy in the world of enterprise voice call routing—for many years the voice world was neatly divided into "home" and "work" numbers. With mobile phones, the lines between a personal and an office extension are blurred—users want the flexibility of the mobile phone but the rich feature set of the modern desk phone. There is a need to reconcile this situation by allowing users to select what functionality they wish to receive when away from the desk.

There have been various schemes to provide enterprise telephony on mobile handsets. These schemes can be broken down into those that are a mobile handset as an extension of an office line and those that are a mobile handset as a replacement of an office line. The goal of the mobile handset as an extension of an office line model is to "extend" the office extension to the phone. An example is the Avaya "Extension to Cellular" system. This system binds together a mobile phone number to an office extension and when the PBX receives an inbound call to the office extension it also rings the mobile phone number bound to it by the enterprise communications server (ECS). Whichever phone picks up first is considered to "own" the call. In this way, users can give out just their office phone number, but can receive calls placed to that number on their cellular phones.

In order to provide additional functionality (such as being able to place outbound calls using the office extension but from the mobile phone), products such as Feature Name Extensions (FNE) exist. These expose internal PBX functionality through externally dialable phone numbers. For example, if a remote user wants to place an outgoing call from their office extension, they would first dial into the FNE number from their mobile phone. The PBX would recognize the user by cross referencing the mobile phone number through caller id, and request that the user enter a PIN. Once this has been done, the PBX allows the user to dial a number and completes the call on the user's behalf.

The mobile handset as a replacement of office line model focuses on providing an implementation of software on a mobile handset such that it can communicate directly with the enterprise PBX and effectively "become" an office phone. Examples of this are the Avaya IP softphone (which runs on PCs and Windows Mobile pocket pcs) and the Research In Motion 77xx series of BlackBerry® devices. While this model may provide robust and flexible functionality, the issue becomes one of transport of data. Because the device needs to be able to communicate directly with the PBX, it requires a secure channel over which to communicate—typically over a virtual private network (VPN). As bulk voice data is transported over the same channel, this requires a broadband connection for mobility—something that cannot be supported on generic wireless networks. For example, the RIM 77xx Blackberry® device requires a Wifi connection in order to provide enterprise voice functionality (over the session initiation protocol (SIP)). This bandwidth requirement makes the pure-replacement model one of limited use.

SUMMARY

In various embodiments, the present invention is directed to a method of facilitating telecommunication functionality on a mobile device. The method includes receiving a request for a telecommunications transaction from the mobile device and retrieving a callback identifier for a user of the mobile device. The method also includes executing the telecommunications transaction, wherein executing the transaction includes establishing a communications session that includes a callback telephony endpoint represented by the callback identifier and at least one target telephony endpoint, wherein a portion of the communications session that includes the callback telephony endpoint is established at least in part by making an outbound call from a telephony switch.

In various embodiments, the present invention is directed to a method of managing call functionality on a mobile device. The method includes sending a request for an application state from the mobile device to a server and transmitting a user profile from the server to the mobile device in response to the request for an application state. The method also includes combining contact information stored on the mobile device with the user profile to create a telecommunications transaction request, transmitting the telecommunications transaction request from the mobile device to the server, and placing, via a telephony switch, a call to execute the telecommunications transaction requested.

In various embodiments, the present invention is directed to a method of facilitating a telecommunications transaction using a telephone system. The method includes initiating, via a mobile device, a request for the telecommunications transaction, routing the request to a server, and identifying a user based on the request. The method also includes adding user profile information of the user to the request and transmitting the request and the user profile information to a control system of the telephone system to facilitate the requested telecommunications transaction.

In various embodiments, the present invention is directed to a method of generating a profile for a user of a mobile device, the profile containing information used by a telecommunications system to facilitate telecommunications functionality to the mobile device. The method includes retrieving an office telephone number of the user, identifying a private branch exchange (PBX) identifier associated with the user, and setting a default callback number to the office telephone number. The method also includes identifying a voice mail telephone number associated with the user and saving the PBX identifier, the default callback number, and the voice mail telephone number to the profile.

In various embodiments, the present invention is directed to a telecommunications system. The system includes a private branch exchange (PBX) device in communication with at least one telephone and a server in communication with the PBX device and a mobile device. The server is configured to receive a request for a telecommunications transaction from the mobile device and to retrieve a callback identifier for a user of the mobile device. The server is also configured to execute the telecommunications transaction, wherein executing the transaction comprises establishing a communications session that includes a callback telephony endpoint represented by the callback identifier and at least one target telephony endpoint, wherein a portion of the communications session that includes the callback telephony endpoint is established at least in part by making an outbound call from a telephony switch.

In various embodiments, the present invention is directed to an apparatus. The apparatus includes means for receiving a request for a telecommunications transaction from a mobile device and means for retrieving a callback identifier for a user of the mobile device. The apparatus also includes means for executing the telecommunications transaction, wherein the means for executing the transaction comprises means for establishing a communications session that includes a callback telephony endpoint represented by the callback identifier and at least one target telephony endpoint, wherein a portion of the communications session that includes the callback telephony endpoint is established at least in part by making an outbound call from a telephony switch.

In various embodiments, the present invention may also integrate directly into other components designed to store and expose the presence or location of users to the enterprise. Examples of such systems may be instant messaging systems, location based detection systems or GPS units located on other handhelds. Embodiments of the present invention may also interpret other pieces of information in order to determine presence, such as activity on various components such as desktop workstations and handheld devices. It may also check the status of work phones to determine whether or not users are currently actively engaged on a phone call. This presence information may be used to determine the availability of one or more target recipients of a call initiated through the system. If a user is not available for any reason, this information can be used to inform the call initiator, or perform another intelligent action such as alerting the intended recipient or waiting for a time when both participants are available and then initiate an enterprise call between the participants.

In various embodiments, the present invention is directed to a computer readable medium having stored thereon instructions which, when executed by a processor, cause the processor to:

receive a request for a telecommunications transaction from a mobile device;

retrieve a callback identifier for a user of the mobile device; and execute the telecommunications transaction, wherein executing the transaction comprises:

establishing a communications session that includes a callback telephony endpoint represented by the callback identifier and at least one target telephony endpoint, wherein a portion of the communications session that includes the callback telephony endpoint is established at least in part by making an outbound call from a telephony switch.

In various embodiments, the present invention may check the presence of one or more recipients of a call in order to programmatically determine the availability of those recipients.

In various embodiments, the present invention may track the status and results of a call for storage in a database system designed to track information about calls such as call time, call duration and caller generated comments regarding that call.

DESCRIPTION

As used herein, the term "mobile device" includes any type of mobile device such as, for example, personal digital assistants (PDAs), wireless laptops, mobile phones, wearable computers, etc. Such devices may employ any type of mobile computing operating system such as, for example, the Palm OS® operating system, the Windows Mobile® operating system, the Blackberry® operating system, Linux-based operating systems, the Symbian® operating system, etc.

Various embodiments of the systems and methods described herein provide call-control functionality (e.g., multiple appearances, call control, hold setting and speed-dialing) available on desk phones while alleviating security and bandwidth concerns. Various embodiments of the present invention utilize an approach where enterprise call-control is separated from bulk voice transport for the purpose of providing rich enterprise telephony over existing voice channels. By separating the two systems from each other, a much lower bandwidth secure connection can be used for sending call control instructions, while the standard voice bearer networks are used for bulk voice traffic. Various embodiments of the present invention use a call-back voice number which is used as a proxy for voice application interaction.

An example of a call-back voice number follows. Amy has office extension 555-1234. She is currently out of the office but has her mobile phone 666-2345. She wishes to place a call to 444-3456. Using a client running on her BlackBerry device, she issues a request for the call with her cell phone indicated as the device to be called back (in some cases Amy's BlackBerry may be voice enabled and may be used as the device to be called back). On the server side, the request is cross referenced with enterprise LDAP to determine Amy's office extension and her cell phone number. Her office PBX is then instructed to place a call on Amy's behalf initiated using her extension (555-1234) and terminated at her cell phone (666-2345) (in other embodiments the call may be initiated using another number, e.g., from a number pool, or the number may not even be associated with a physical deskset). Once this call is connected, the target number (444-3456) is added, completing the call (e.g., the target number is also connected by the PBX via conventional call routing). From the perspective of the recipient, Amy is calling from her office line, even though she is actually using her mobile phone's voice connection. While the example describes the first leg of the voice connection being between Amy's cell phone and the PBX, and the second leg being between the PBX and the target number, the order in which the call is set up may be reversed or substantially simultaneous.

Figure 1:
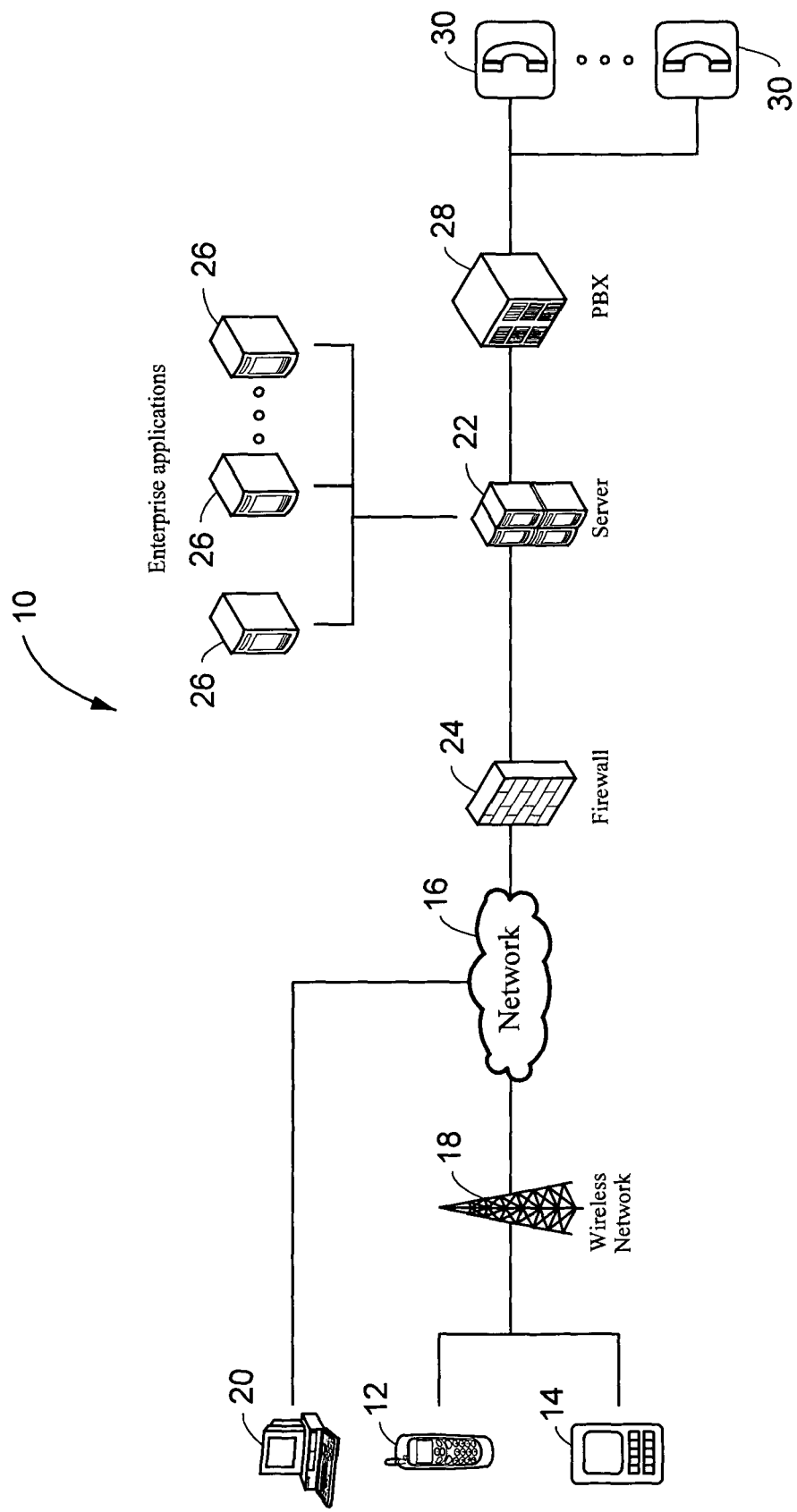
FIG. 1 illustrates an embodiment of a mobile computing system.

FIG. 1 illustrates an embodiment of a mobile computing system 10. In the system 10, a mobile telephone 12 and a device 14 (either referred to herein as "handheld mobile devices" or "mobile devices") are in communication with a network 16 via a wireless network 18. The telephone 12 and the device 14 are examples of devices that may be in communication with the wireless network 18 and it can be understood that any type of wireless device may be in communication with the wireless network 18. The wireless network 18 may be any type of network, such as a cellular network, wireless telephone network, or a radio communications network. The network 16 may be any type of network such as, for example, a local area network (LAN) or the Internet. A computer 20 is in communication with the network 16. The computer 20 may be any type of computer such as, for example, a personal computer.

In various embodiments, one or more of the telephone 12 and the mobile device 14 may include a software application client. The software client may utilize a secure connection to a server 22 as a communication and call control channel. The client may also provide a general user interface (UI) that users may interact with in order to provide secure transactions. On a mobile device such as a BlackBerry device the client may be a thick client written in, for example, Java J2ME. However, the client may be implemented in other languages or as a web-based console.

In various embodiments the software client may utilize a secure connection to the server 22 over which to issue (initiate) and receive transactions and data (e.g., a client may query and receive the voicemail status of the user). The client also may provide a UI for the end user to interact with the system 10, view information and issue transactions. The client may also maintain a client side profile of user preferences and settings that can be used to customize the way that transactions are issued. Also, the client may provide an always-running mechanism or background application to which the server 22 can send real time alerts and information.

The network 16 is in communication with the server 22, which manages mobile enterprise applications. In various embodiments the server 22 may, for thick client devices, expose a set of functionality through a network protocol (e.g., XML or SIP) that allows client applications on the telephone 12 and/or the mobile device 14 to issue telephony requests and queries. The server 22 also may enhance received transactions from devices 12, 14 with information from local enterprise application data stores such as databases and LDAP directories (not shown). The server 22 may also expose a thin-client web-page based application that can be provided to users of devices 12, 14 which may not be capable of running a native client application. The server 22 may communicate with a private branch exchange (PBX) system 28 through an appropriate API (the exact API and infrastructure may differ depending on the particular PBX vendor) in order to perform telephony actions. Embodiments of the present invention are also applicable to other telephone switches or telephony systems for routing voice calls, which may include VOIP systems.

A security device such as a firewall 24 may be interposed between the network 16 and the server 22. The server 22 is in communication with enterprise applications 26 (running on other computer systems and/or on the server 22) and the PBX 28. Telephones 30 are in communication with the PBX 28. In various embodiments, the PBX 28 does not run any custom software to allow the functionality of the present invention, but it is an active participant. In various embodiments the PBX 28 allows the system 10 to programmatically control a given extension in order to place calls, place calls on hold, etc. Also, the PBX 28 allows the system 10 to receive events regarding a given extension (such as when it goes on/off hook, when it receives voicemail, etc).

In various embodiments the system 10 extends backend functionality to the devices 12, 14 using telephony as a bulk data transport channel. The enterprise applications 26 and data sources (not shown) may provide data to augment transactions that are issued by the user from the mobile devices 12, 14. For example, the user may only specify a desire to call a given user—an LDAP directory may be used to look up the specific phone numbers of that user. Also, the user may specify that they want a conference call with all participants of a particular meeting. The system may check the calendar entry in, for example, Microsoft Exchange, look up the users' phone numbers, then create a conference call with those numbers as participants. The enterprise applications 26 and data sources may provide data to the user over a phone call. For example, a query to a CRM system may be provided on the mobile devices 12, 14. The system 10 queries the CRM system to retrieve the relevant information, then calls the user back to provide that data.

Figure 2:
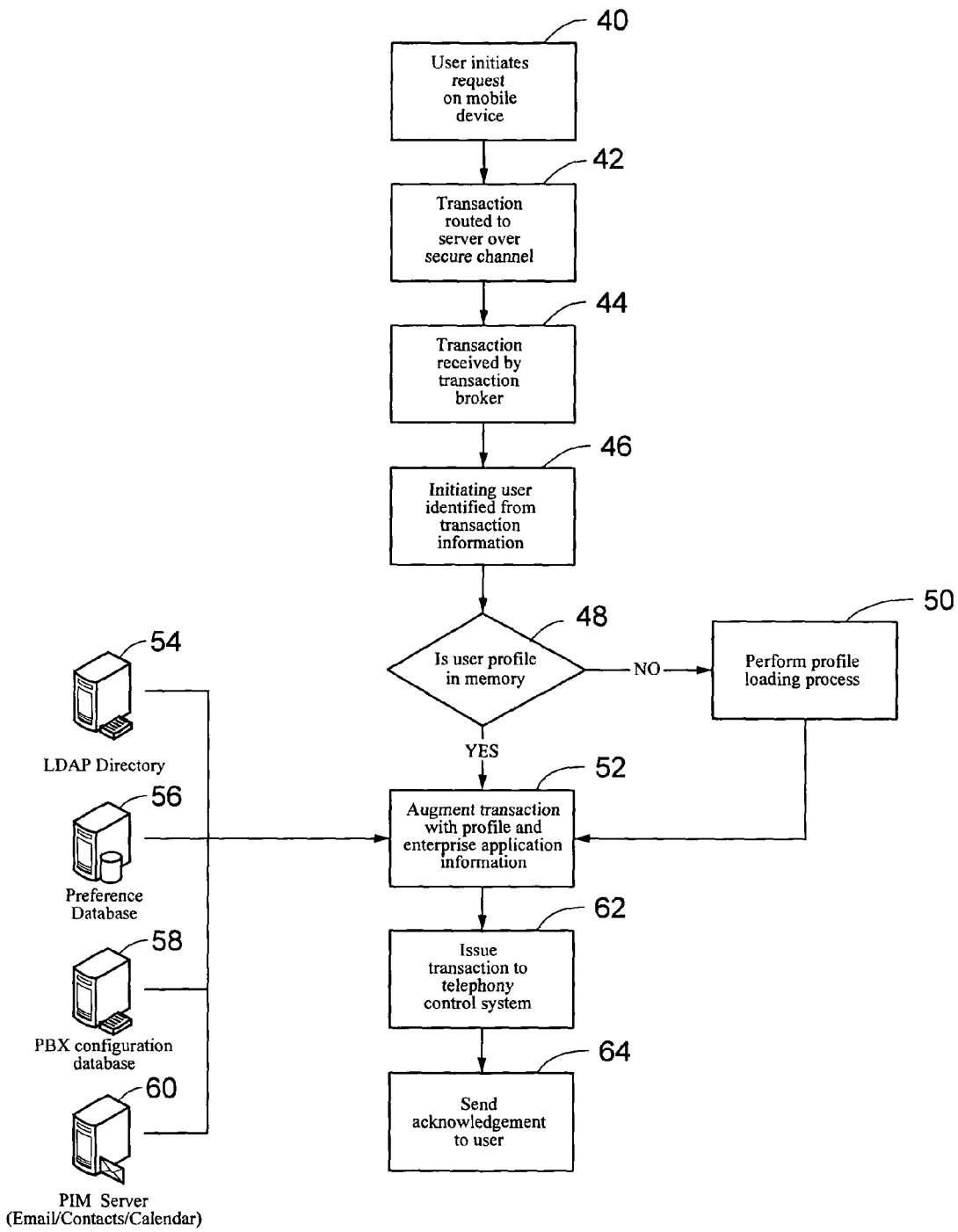
FIG. 2 illustrates an embodiment of a mobile computing process workflow.

FIG. 2 illustrates an embodiment of a mobile computing process workflow. At step 40, a user of a mobile device initiates a request to perform an action on the mobile device. The action may be a PBX telephony function that the user is capable of performing on a telephone connected to the PBX. In various embodiments, a request may only be initiated by a mobile device that is authorized to make such a request.

At step 42, the requested transaction is routed to a server that manages mobile enterprise applications. The transaction may be routed, for example, over a secure channel. At step 44, the transaction is received by the server (e.g., transaction broker software on the server) and at step 46 initiating user information is extracted and authenticated from the transaction data sent with the request. At step 48, it is determined if the user profile of the user making the requested transaction is in memory (e.g., in a profile cache of the server). If the profile is not stored in memory, at step 50 a profile is created or loaded from a database (i.e., the user is provisioned).

At step 52, the transaction is augmented with any missing information that may be required to complete the transaction based on profile information of all participants in the transaction. In various embodiments, such information may be, for example, telephone numbers, email addresses, calendar entries, etc. and may be obtained from internal or external enterprise applications such as, for example, a lightweight directory access protocol (LDAP) directory 54, a preference database 56 (e.g., containing default information and user preferances), a PBX configuration database 58, a personal information manager (PIM) server 60, a CRM system, sales databases, etc. Also at this stage, the system may perform queries against any presence systems or indicators of presence that may be available to it. Examples of presence indicators may include, but are not limited to, instant messaging presence repositories, free-busy calendar information, activity indicators from desktop and handheld devices as well as the status of the user's enterprise telephone extension. For example, a user who is active on instant messaging and is not on the phone may be deemed to be available whereas a user who is active on instant messaging but is on a call may be deemed to be unavailable. This presence information is combined with the call information to determine when the best time to initiate the call would be. If the target user is unavailable, such status may be communicated back to the initiating user.

At step 62, the transaction is issued to the telephony system that is responsible for controlling the PBX voice system and at step 64 an acknowledgement is sent to the initiating user (and any other participants) if such an acknowledgement is requested in the initial transaction (it could also be the case that acknowledgments are required by default).

Figure 3:
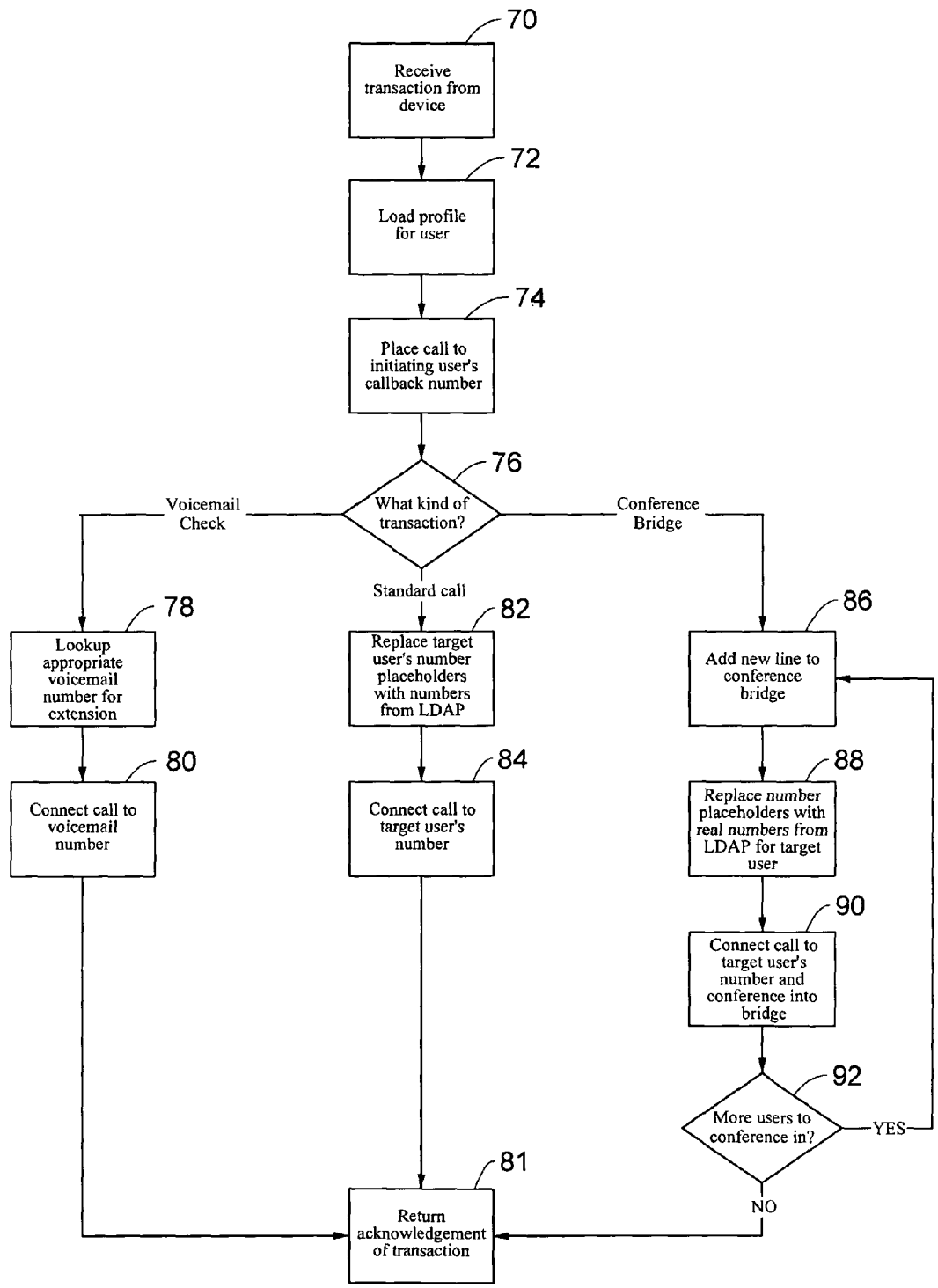
FIG. 3 illustrates an embodiment of a server workflow.

FIG. 3 illustrates an embodiment of a server workflow that may be performed by a server that manages mobile enterprise applications. At step 70 the server receives a transaction request from a mobile device and at step 72 a user profile is loaded. At step 74 a call is placed to a callback number (i.e., a communication session is established that includes a callback telephony endpoint represented by the callback number and at least one target telephony endpoint) that is specified in the user profile of the initiating user (it could also be the case that the callback number is specified by the initiating user, e.g., overriding user profile information). At step 76, it is determined whether the transaction is a voicemail check, a standard call, or a conference bridge. It can be understood that the transaction may be any other type of transaction and the three transactions illustrated in FIG. 3 are exemplary only.

If the transaction is a voicemail check transaction, at step 78 the appropriate voicemail number (i.e., target telephony endpoint) for the user's office extension is retrieved from the user profile (it could also be the case that this information was already cached at step 72) and at step 80 the user is connected with a voicemail system. An acknowledgement of the transaction is returned to the user at step 81.

If the transaction is a standard call as determined at step 76, the target user's (i.e., the called user's) number (i.e., a target telephony endpoint that is identified by, for example, a routable phone number, an IP address, etc.) is obtained from, for example, an LDAP directory at step 82 (it could also be the case that the target user's number is specified by the initiating user) and at step 84 the call is connected to that number. An acknowledgement of the transaction is returned to the requesting user at step 81.

If the transaction is a conference transaction as determined at step 76, a conference bridge is created within the telephony switch if one does not already exist already, and a new line is added to the conference bridge at step 86. At step 88, the number (i.e., target telephony endpoint) that is to be conferenced is retrieved from, for example, an LDAP directory and at step 90 the call is connected to the number and the target user is conferenced into the bridge. At step 92 it is determined if there are more target users that need to be conferenced in. If so, the process returns to step 86. If there are no further users to be conferenced in, an acknowledgement of the transaction is returned to the requesting user at step 81. Embodiments of the present invention apply to conference calls as well as conference bridges.

Figure 4:
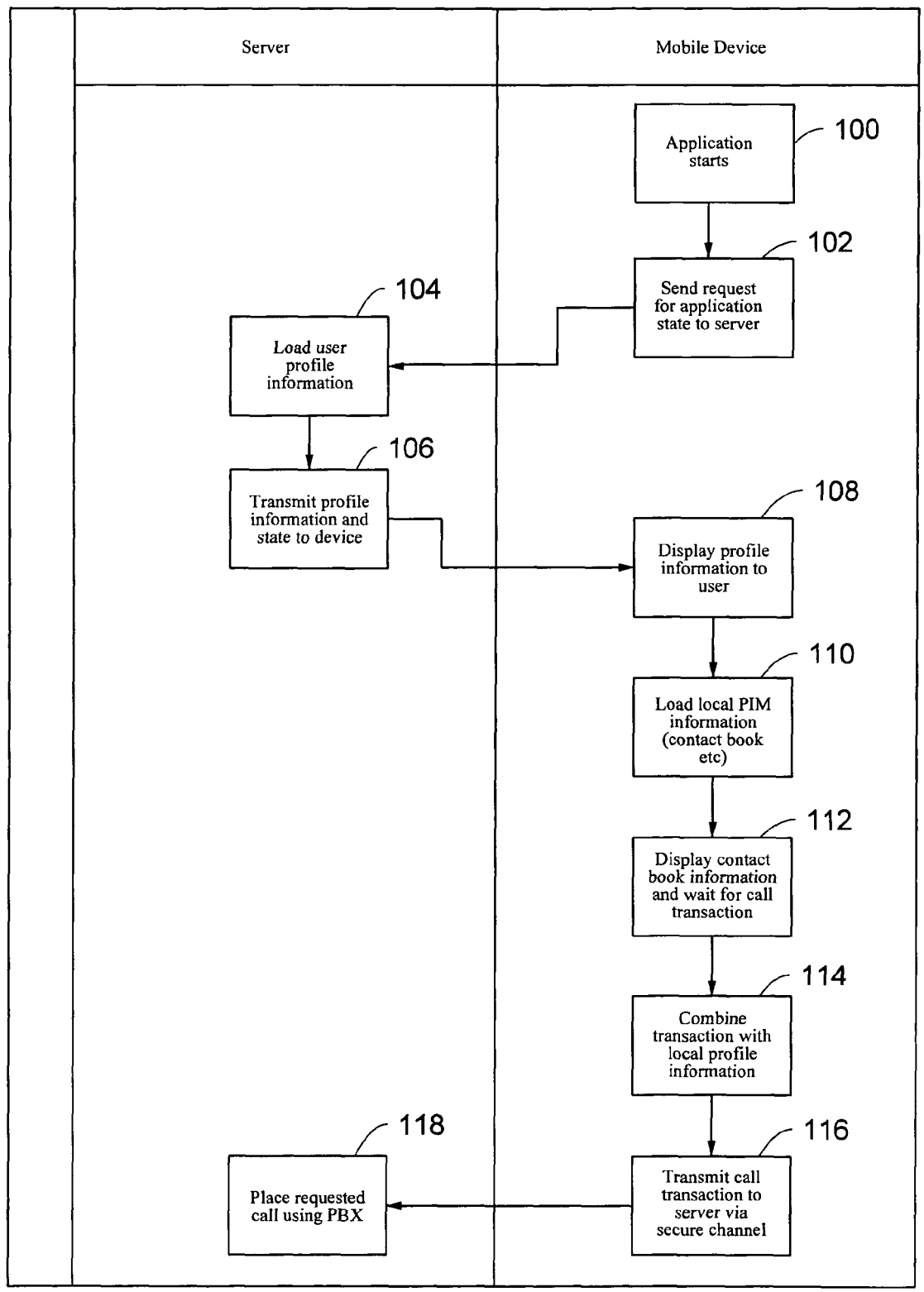
FIG. 4 illustrates an embodiment of a mobile device workflow.

FIG. 4 illustrates an embodiment of a mobile device workflow. At step 100, an application for managing PBX functionality on a mobile device launches. The application may be launched by a user of the mobile device or may be started automatically upon, for example, startup of the mobile device. At step 102, if the initiated application is stateless (i.e., does not possess the call back phone number, voicemail status, PBX desk handset status, etc.), a request is sent to a server that manages mobile enterprise applications for such state information. At step 104, the server loads user profile information from, for example, an LDAP directory, a PBX system, etc.

At step 106, the profile and state information is sent to the mobile device via, for example, a secure communications channel. At step 108, the profile information is displayed to the user of the mobile device and at step 110 local contact information from, for example, a PIM in the mobile device is loaded into the application. At step 112, the local contact information is combined with the profile information and displayed to the user on the mobile device until the user selects a transaction.

At step 114, a selected transaction is combined with the local profile information and at step 116 the transaction is transmitted from the mobile device to the server via, for example, a secure channel. At step 118, the server places the requested call as identified in the transaction using a PBX system.

Figure 5:
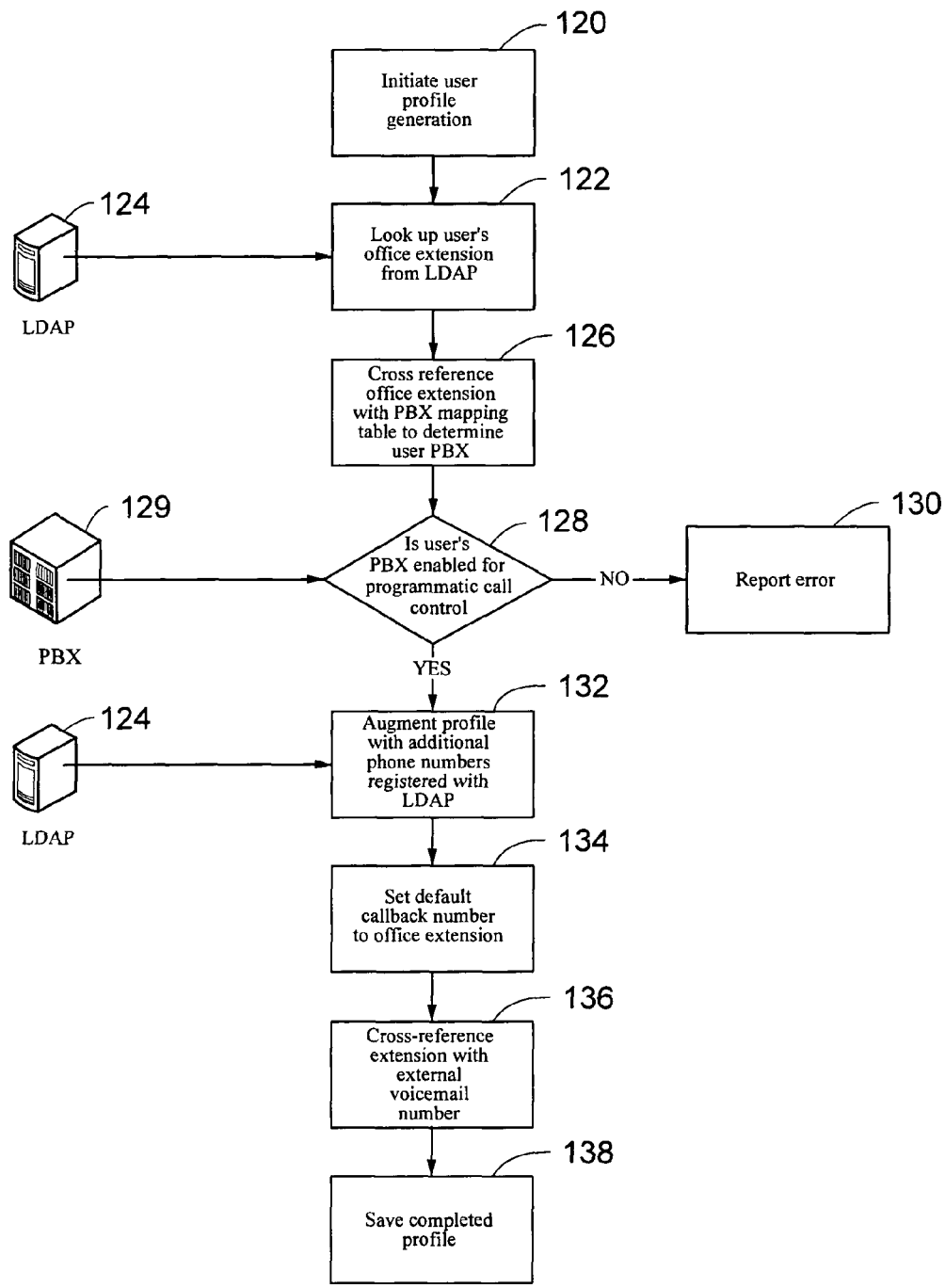
FIG. 5 illustrates an embodiment of a process for creating a user profile.

FIG. 5 illustrates an embodiment of a process for creating a user profile by a server that manages mobile enterprise applications. At step 120, the user profile generation process is initiated. Such initiation may be done, for example, on startup of the system or when provisioning a new user. At step 122, the PBX extension of the user for which the profile is being generated is retrieved from, for example, an LDAP directory 124. At step 126, the user's PBX extension is cross referenced with a PBX mapping table to determine the PBX to which the user is assigned.

At step 128, the process determines, from the user's PBX 129, whether the PBX 129 is enabled for programmatic call control. If the PBX 129 is not so enabled, an error is reported at step 130. At step 132, the profile is augmented with additional phone numbers from, for example, the LDAP 124. Such additional phone numbers may be phone numbers that the user desires to use other than the user's PBX extension and may include a mobile number, a home phone number, etc.).

At step 134, the default callback number for the user may be set to the PBX office extension number for better security. At step 136, the user's PBX extension is cross referenced with the user's external voicemail number so that if the PBX 129 employs different external voicemail numbers the profile will contain the correct number. At step 138, the completed profile is saved for the user.

Various embodiments of the present invention provide mobile office extension control functionality. Such embodiments give a user access to office telephony functions by securely controlling the user's office extension directly through the enterprise PBX. On the mobile device, the user interacts with the system through a client. The user is able to perform actions such as:

Cause the PBX to place a call on the user's behalf using their office extension. The call is first placed to the registered callback number and then the call is completed to the destination.

Select a series of users from a local address book and have the system create a conference call with those users as participants. The initiating user may select which numbers to reach the participants on, or may leave it to the system which will progressively attempt to reach the users on the numbers they have registered in, for example, an LDAP directory.

Manipulate an existing call with additional actions such as:
  Conferencing in a new participant
  Dropping a participant
  Putting the current call on hold
  Muting the current call Check the availability and status of various people by instructing the backend to programmatically interrogate various presence repositories and sources of indirect presence information.

Various embodiments of the present invention allow a user to set a callback number. In such embodiments, the user is able to select from their registered office/home/mobile numbers in, for example, an LDAP directory or the user can instead set the number to another arbitrary number. If the user selects an LDAP-based number, this number is automatically resolved on the server side.

Various embodiments of the present invention allow a user to use a client to programmatically check the status of the user's voicemail (i.e., whether the user has new voicemail waiting on the user's office extension). Also, the user may see the number of voicemails received, when they were received and what numbers they are from. The user may also configure the system (e.g., a voicemail controlling agent) to automatically notify the user on, for example, a handheld device such as a BlackBerry device when a new voicemail is received by the enterprise system.

Various embodiments of the present invention allow a user to request to be connected to voicemail on a callback device. This is similar to a standard call, except the target number is automatically resolved by the system to be the externally dialable number for the user's voicemail system (each user may have a different external voicemail number depending on their home PBX).

Various embodiments of the present invention provided may be integrated into a paging/messaging system (e.g., SMS, email, instant messaging or alert). If a page/message is sent to a user, the sender may also choose to associate a phone number with the page/message. When the user receives the page/message, the user may automatically request to be connected to the sender on this number using the system. If there is no number associated with a page/message, the user may still choose to connect to the sender and the system will resolve the target numbers using, for example, an LDAP directory.

In various embodiments of the present invention, the server may attempt to intelligently decide the most appropriate phone numbers for target users. By maintaining presence and location information inside the client as well as the backend, the system allows users to select which phone number is best for them at any given time. It can also maintain a track of activity on a user's desktop or mobile device (e.g., a BlackBerry device) to determine whether a user is mobile or at their desk. Calls sent through the system may then use this presence information to select the appropriate number to dial.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium can include, for example and without limitation, memory devices such as diskettes, compact discs of both read-only and writeable varieties, digital versatile discs (DVD), optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

As used herein, a "computer" or "computer system" may be, for example and without limitation, either alone or in combination, a personal computer (PC), server-based computer, main frame, microcomputer, minicomputer, laptop, personal data assistant (PDA), cellular phone, pager, processor, including wireless and/or wireline varieties thereof, and/or any other computerized device capable of configuration for processing data for either standalone application or over a networked medium or media. Computers and computer systems disclosed herein can include memory for storing certain software applications used in obtaining, processing, storing and/or communicating data. It can be appreciated that such memory can be internal or external, remote or local, with respect to its operatively associated computer or computer system. The memory can also include any means for storing software, including a hard disk, an optical disk, floppy disk, ROM (read only memory), RAM (random access memory), PROM (programmable ROM), EEPROM (extended erasable PROM), and other suitable computer-readable media.

It is to be understood that the figures and descriptions of embodiments of the present invention have been simplified to illustrate elements that are relevant for a clear understanding of the present invention, while eliminating, for purposes of clarity, other elements. Those of ordinary skill in the art will recognize, however, that these and other elements may be desirable for practice of various aspects of the present embodiments. However, because such elements are well known in the art, and because they do not facilitate a better understanding of the present invention, a discussion of such elements is not provided herein. It can be appreciated that, in some embodiments of the present methods and systems disclosed herein, a single component (e.g., a server, a telephony switch) can be replaced by multiple components, and multiple components replaced by a single component, to perform a given function or functions. Except where such substitution would not be operative to practice the present methods and systems, such substitution is within the scope of the present invention. Examples presented herein, including operational examples, are intended to illustrate potential implementations of the present method and system embodiments. It can be appreciated that such examples are intended primarily for purposes of illustration. No particular aspect or aspects of the example method, product, computer-readable media, and/or system embodiments described herein are intended to limit the scope of the present invention.

It should be appreciated that figures presented herein are intended for illustrative purposes and are not intended as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts/elements/steps/functions may be made within the principle and scope of the invention without departing from the invention as described in the appended claims.

What is claimed is:

1. A method of facilitating establishment of a telecommunication transaction using a mobile device, the method comprising:

launching an application for remotely managing private branch exchange (PBX) functionality on the mobile device, wherein the launching is in response to a request from a user of the mobile device, and wherein the application comprises a user interface that enables the user to initiate telecommunications transactions;

receiving, by a server, a call control request for a telecommunications transaction from the mobile device, wherein the request uses a data network protocol and is received via a call control channel separate from bulk voice transport, wherein the bulk voice transport comprises at least one voice channel to transport voice data;

determining, by the server, a PBX extension for the user;

retrieving, by the server a callback identifier for a user of the mobile device to be used in the requested telecommunications transaction, wherein the callback identifier represents a callback telephony endpoint, wherein the application enables the user to select the callback telephony endpoint for the requested telecommunications transaction, where the callback telephony endpoint is selectable from among the mobile device and one or more other telecommunications devices; and executing, by at least the server, the telecommunications transaction, wherein the executing occurs subsequent to the call control request being received, and wherein executing the telecommunications transaction comprises:

establishing a communications session that includes the callback telephony endpoint represented by the callback identifier and at least one target telephony endpoint indicated by the user, wherein a first portion of the communications session that includes the callback telephony endpoint is established at least in part by making an outbound call from a PBX associated with the user, via the bulk voice transport, to the callback telephony endpoint, and a second portion of the communications session that includes the target telephony endpoint is established at least in part by making an outbound call from the PBX, via the bulk voice transport, to the target telephony endpoint.

2. The method of claim 1, wherein the second portion of the communications session that includes the at least one target telephony endpoint is established by connecting the PBX to the target telephony endpoint that is identified by one of a routable phone number and an IP address.

3. The method of claim 1, wherein the second portion of the communications session that includes the at least one target telephony endpoint is established by connecting the PBX to the target telephony endpoint that is one of a conference bridge and a voicemail system.

4. The method of claim 1, wherein receiving a call control request for a telecommunications transaction includes one of receiving a request for a voicemail check, a standard call, and a conference bridge.

5. The method of claim 1, wherein establishing a communications session further comprises at least one action selected from the group consisting of:
   querying a location-based detection system for a location of a target recipient associated with the target telephony endpoint; and
   querying a computer device associated with the target recipient for an availability of the target recipient.

6. The method of claim 1, wherein executing the telecommunications transaction further comprises retrieving a voicemail telephone number of a voicemail system, where the voicemail number corresponds to the user, and establishing the communications session to include the voicemail system.

7. The method of claim 1, wherein the server comprises at least one processor and is in communication with at least one memory circuit.

8. The method of claim 1, further comprising determining by the server if the user is authorized to make the requested telecommunications transaction prior to establishing the communications session.

9. The method of claim 1, wherein retrieving the callback identifier comprises at least one of:
   parsing a profile associated with the user of the mobile device; and
   receiving the callback identifier from the user.

10. The method of claim 1, wherein the first portion of the communications session is established by instructing the PBX to initiate the outbound call using the PBX extension for the user, comprising the user's PBX of extension, and terminated at the user's specified callback endpoint.

11. The method of claim 1, further comprising the PBX providing event information regarding the user's receipt of voicemail, wherein the application programmatically checks the status of the user's voicemail, thereby determining whether the user has new voicemail waiting on the user's PBX extension, and automatically notifying the user on the mobile device that new voicemail has been received.

12. The method of claim 11, further comprising the application enabling the user to request to be connected, on the specified callback endpoint, to the user's voicemail as the target endpoint.

13. The method of claim 1, further comprising the user receiving a message on the mobile device from an electronic messaging system, wherein the sender of the message has associated a phone number with the message, and the user requesting to be automatically connected to the telephone number associated with the received message as the target telephony endpoint.

14. The method of claim 1, further comprising the user receiving a message on the mobile device from an electronic messaging system, the user requesting to be automatically connected to the sender of the received message, resolving a telephone number associated with the sender of the message, and automatically connecting to the resolved telephone number as the target telephony endpoint.

15. A method of facilitating establishment of a telecommunications transaction using a telephone system, the method comprising:
   launching an application for remotely managing private branch exchange (PBX) functionality on a mobile device, wherein the application includes a user interface that enables a user of the mobile device to initiate telecommunications transactions;
   initiating, via the mobile device, a request for the telecommunications transaction;
   adding, by the mobile device, user profile information of the user to the request;
   transmitting, by the mobile device, the request and the user profile information to a control system of the telephone system and via a call control channel separate from bulk voice transport, wherein the bulk voice transport comprises at least one voice channel to transport voice data;
   retrieving, by a server, a callback identifier for a user of the mobile device to be used in the requested telecommunications transaction, wherein the callback identifier represents a callback telephony endpoint, wherein the application enables the user to select the callback telephony endpoint for the requested telecommunications transaction, where the requested callback telephony endpoint is selectable from among the mobile device and one or more other telecommunication devices; and
   executing, by at least the server, the telecommunications transaction, wherein the executing occurs subsequent to the call control request being received, and wherein executing the transaction comprises:
      establishing a communications session that includes the callback telephony endpoint represented by the callback identifier and at least one target telephony endpoint indicated by the user, wherein a first portion of the communications session that includes the callback telephony endpoint is established at least in part by making an outbound call from a PBX associated with the user, via the bulk voice transport, to the callback telephony endpoint, and a second portion of the communications session that includes the target telephony endpoint is established at least in part by making an outbound call from the PBX, via the bulk voice transport, to the target telephony endpoint.

16. The method of claim 15, further comprising sending an acknowledgment that the request has been transmitted to the user via the mobile device.

17. The method of claim 15, further comprising adding enterprise application information to the request.

18. The method of claim 15, wherein the telecommunications transaction includes one of receiving a request for a voicemail check, a standard call, and a conference bridge.

19. The method of claim 15, wherein the server comprises at least one processor and is in communication with at least one memory circuit.

20. A telecommunications system comprising:

means for executing an application for remotely managing private branch exchange (PBX) functionality on a mobile device, wherein the application includes a user interface that enables a user of the mobile device to initiate telecommunications transactions;

means for receiving a request for a telecommunications transaction from the mobile device, wherein the request is formatted according to a data network protocol and is received via a call control channel separate from bulk voice transport, wherein the bulk voice transport comprises at least one voice channel to transport voice data;

means for retrieving a callback identifier for a user of the mobile device to be used in the requested telecommunications transaction, wherein the callback identifier represents a callback telephony endpoint, wherein the application enables the user to select the callback telephony endpoint for the requested telecommunications transaction, where the requested callback telephony endpoint is selectable from among the mobile device and one or more other telecommunication devices; and means for executing the telecommunications transaction, wherein the executing occurs subsequent to the call control request being received, and wherein the means for executing the transaction comprises:

means for establishing a communications session that includes the callback telephony endpoint represented by the callback identifier and at least one target telephony endpoint indicated by the user, wherein a portion of the communications session that includes the callback telephony endpoint is established at least in part by making an outbound call from a PBX associated with the user, via the bulk voice transport, to the callback telephony endpoint, and a second portion of the communications session that includes the target telephony endpoint is established at least in party by making an outbound call from the PBX, via the bulk voice transport, to the target telephony endpoint.

\* \* \* \* \*